United States Patent
Basel et al.

(10) Patent No.: US 6,641,946 B2
(45) Date of Patent: Nov. 4, 2003

(54) FUEL DISSIPATER FOR PRESSURIZED FUEL CELL GENERATORS

(75) Inventors: Richard A. Basel, Pittsburgh, PA (US); John E. King, Pittsburgh, PA (US)

(73) Assignee: Siemens Westinghouse Power Corporation, Orlando, FL (US)

(*) Notice: Subject to any disclaimer, the term of this patent is extended or adjusted under 35 U.S.C. 154(b) by 248 days.

(21) Appl. No.: 09/784,612

(22) Filed: Feb. 15, 2001

(65) Prior Publication Data

US 2002/0110717 A1 Aug. 15, 2002

(51) Int. Cl.[7] .......................... H01M 8/04; H01M 8/12; H01M 8/00; H01M 8/10; H01M 10/44
(52) U.S. Cl. ..................... 429/23; 429/13; 429/22; 429/26; 429/31; 320/101
(58) Field of Search ............... 429/22, 26, 13, 429/23, 31; 320/100, 101

(56) References Cited

U.S. PATENT DOCUMENTS

| | | |
|---|---|---|
| 4,395,468 A | 7/1983 | Isenberg |
| 4,414,447 A | 11/1983 | Hruda |
| 4,431,715 A | 2/1984 | Isenberg |
| 4,490,444 A | 12/1984 | Isenberg |
| 4,879,189 A * | 11/1989 | Snopkowski ............... 429/13 |
| 5,023,150 A * | 6/1991 | Takabayashi ............... 429/22 |
| 5,105,142 A * | 4/1992 | Takabayashi ............. 320/100 |
| 5,573,867 A | 11/1996 | Zafred et al. |
| 5,808,448 A * | 9/1998 | Naito |
| 6,025,083 A * | 2/2000 | Veyo et al. ................. 429/13 |

FOREIGN PATENT DOCUMENTS

JP         63181268        7/1988

OTHER PUBLICATIONS

U.S. Department of Energy Oct. 2000, Fuel Cell Handbook 5th edn. EG&G Services Parsons, Inc., p 9–47.*

* cited by examiner

Primary Examiner—Stephen Kalafut
Assistant Examiner—Julian Mercado

(57) ABSTRACT

An apparatus and method are disclosed for eliminating the chemical energy of fuel remaining in a pressurized fuel cell generator (10) when the electrical power output of the fuel cell generator is terminated during transient operation, such as a shutdown; where, two electrically resistive elements (two of 28, 53, 54, 55) at least one of which is connected in parallel, in association with contactors (26, 57, 58, 59), a multi-point settable sensor relay (23) and a circuit breaker (24), are automatically connected across the fuel cell generator terminals (21, 22) at two or more contact points, in order to draw current, thereby depleting the fuel inventory in the generator.

16 Claims, 4 Drawing Sheets

FUEL DISSIPATER FOR PRESSURIZED FUEL CELL GENERATORS

GOVERNMENT CONTRACT

The Government of the United States of America has certain rights in this invention pursuant to Contract No. DE-FC26-97FT34139 awarded by the U.S. Department of Energy.

BACKGROUND OF THE INVENTION

1. Field of the Invention

The present invention relates to pressurized fuel cell generators, and more particularly relates to an energy dissipater which reduces unwanted heat build-up in the combustion zone of the generator during shut-down of the generator.

2. Background Information

Conventional solid oxide electrolyte fuel cell (SOFC) generators typically include tubular fuel cells arranged in a grouping of rectangular arrays. Each fuel cell has an upper open end and a lower closed end, with its open end extending into a combustion zone. A typical tubular fuel cell has a cylindrical inner air electrode, a layer of electrolyte material covering most of the outer surface of the inner air electrode, and a cylindrical fuel electrode covering most of the outer surface of the electrolyte material. An interconnect material extending along the length of the fuel cell covers the circumferential segment of the outer surface of the air electrode which is not covered by the electrolyte material. An electrically conductive strip covers the outer surface of the interconnect material, and allows electrical connections to be made to an adjacent fuel cell or bus bar. The air electrode may comprise a porous lanthanum-containing material such as lanthanum manganite, while the fuel electrode may comprise a porous nickel-zirconia cermet. The electrolyte, which is positioned between the air and fuel electrodes, typically comprises yttria stabilized zirconia. The interconnect material may comprise lanthanum chromite, while the conductive strip may comprise nickel-zirconia cermet. Examples of such SOFCs are disclosed in U.S. Pat. No. 4,395,468 (Isenberg), U.S. Pat. No. 4,431,715 (Isenberg) and U.S. Pat. No. 4,490,444 (Isenberg). More advanced pressurized SOFC generators are disclosed in U.S. Pat. No. 5,573,867 (Zafred et al.).

During operation of the fuel cell generator, air is provided to an inside air electrode of each tubular cell, and hydrogen-rich fuel is supplied to an outside fuel electrode surface. The fuel and oxidant are utilized electrochemically to produce electrical energy. The depleted air, comprising about 16 percent oxygen, exits the open end of the cell, and the spent fuel of low hydrogen concentration is eventually discharged into a combustion area surrounding the cell open ends.

During normal run conditions, the fuel gas entering the SOFC combustion zone has a low concentration of hydrogen due to the fuel being consumed within the cell stack. In addition, a relatively large amount of oxygen depleted air exits the cells, keeping the air/fuel ratio well beyond stoichiometric in the combustion plenum. This helps to keep the combustion zone temperature at approximately 950° C., well within the allowable range for the cells. In addition, the high volumetric flow of air out of each cell may be sufficient to protect the air electrode and open end from any risk of hydrogen reduction.

However, during certain generator stop conditions with the stack in an open circuit condition, that is, loss of grid connection, the air supply may be reduced to a maximum of about 10 percent or less of the normal airflow. The fuel flow to the generator is replaced with a reducing purge flow which serves to protect the fuel electrode from oxidation. This purge flow may cause any stored fuel within the generator to be pushed into the combustion zone where it burns with the available air. There are two primary concerns with this situation. First, the air/fuel ratio is closer to stoichiometric and will result in more combustion and a hotter combustion zone temperature. Second, the reduced air flow leaving each cell may not be sufficient to completely protect the open ends of the cells from hydrogen reduction. Either of these problems have the potential for causing damage to the fuel cells.

Several alternatives have been proposed in the past in an attempt to lessen the severity of this condition. The auxiliary airflow could be increased, thereby reducing the combustion zone temperature, as well as providing added protection for the open ends. This would require larger, more expensive blowers, as well as an uninterruptable power supply large enough to handle their power requirements. The cell open ends presently extend a short distance beyond the upper open end support board, which forms the floor of the combustion zone. Extending the open ends further may move the ends away from the board and reduce the risk of hydrogen reduction, provided that the low airflow still provides air to the board surface so that combustion occurs there and not at the open cell end. However, this approach has the drawback of exposing more of the cell surface area to the flame temperature. Conversely, reducing the cell extension will protect more of the cell surface from the flame, but possibly expose the open ends to more unburned hydrogen. Yet another solution may be to coat the open ends with a material that will prevent reduction of the exposed air electrode.

U.S. Pat. No. 5,023,150 (Takabayashi) taught a fuel cell power generator wherein a resistor is connected by a switching circuit across positive and negative terminals when the generator is shut down. Takabayashi involves clamping a fixed load across the generator terminals. The size of the load is not changed. The load is switched on or off based on the stack voltage. If this is done very rapidly, it has the appearance of controlling the current by changing the effective resistance of the load, without actually changing that resistance. Nonetheless, the actual load resistance remains the same. This type of control is often called time proportioning, because a fixed load is connected across the supply for a portion of the cycle, and disconnected for its balance. Since the Takabayashi invention uses semiconductor switches, it becomes expensive, or unfeasible, when the current is high.

In U.S. Pat. No. 6,025,083, Veyo et al. attempted to solve the above-described problems for non-pressurized SOFC generators by utilizing a fuel dissipater concept, consisting of a fixed resistive load that is switched across the cell stack terminals upon transition to normal or emergency shutdown. The load draws current, which electrochemically consumes the fuel flushed by a nitrogen/hydrogen purge gas mixture used in such situations, thus reducing the combustion zone temperatures and protecting the cells. As the fuel inventory is depleted by the load, the stack voltage drops in response to reduced $H_2$ and CO concentrations and, at some point, a minimum allowable terminal voltage, is reached. The limiting voltage is equal to the nickel oxidation potential at the operating temperature, plus some margin. When this is reached, a voltage sensing circuit disconnects the load by actuating a shunt trip breaker. The voltage sensing and switching circuit can be powered by the stack voltage, making the fuel dissipater "passive" (self-contained). Other dissipater designs may incorporate sensing circuits which are powered by external sources.

The previously described Veyo et al. fuel dissipater design involved a constant resistance value with only two switching functions: on and off. That design consisted of a resistive load bank (in practice, two electric immersion heaters connected in parallel) and a voltage sensing and switching circuit. The heaters were mounted in the steam supply system water tank and were expected to draw about 7 amps/cell. The voltage sensor was an alarm module which actuated a shunt trip breaker when the nickel oxidation voltage (0.62 V nominal) plus a margin (0.05 V) was reached. The electronics were powered by the stack cell terminal voltage using a voltage divider circuit. The expected duration of the dissipation current was about two minutes, until the load was disconnected by the sensed low stack voltage. This worked well for atmospheric pressure SOFC generators, but many recent designs for SOFC generators including hybrid soft/micro-turbine generators, require high pressure operation for greater efficiency. In Veyo, et al., the size of the load was constant and resistance could not be changed in response to a sudden voltage change making it not flexible in changing voltage situations.

However, for an SOFC generator operating at higher pressures (that is, greater than one atmosphere), the conditions and requirements for a fuel dissipater are significantly different. First, the volume of the fuel inventory to be dissipated is significantly higher. In the atmospheric unit, only fuel in open volume is considered. A significant quantity of fuel contained within the porosity of the cell stack insulation boards, usually alumina, is not included, since flow from the porous insulation board to the stack is assumed to be by diffusion only and, therefore, occurs at a slow rate and is considered to be insignificant. However, during shutdown in a pressurized unit, the generator is placed on open circuit and the containment is depressurized. Fuel stored within the board porosity will flow out of the boards due to the depressurization. As a result, the volume of fuel in the boards (approximately 94% porous) must be included in the stored fuel inventory. Second, the fuel flow rate in the pressurized design is controlled primarily by the depressurization rate and is much larger than for the atmospheric design. For representative pressurized generator designs, the nominal cell current can be as high as about 80 amps/cell at 85% fuel consumption, compared to 7 amps/cell for a comparable atmospheric design. For a three-resistor unit, currents in the range of 240 amps may be required by a pressurized design, versus 21 amps for an atmospheric design. Third, the fuel flow rate to the cells is not well known due to various factors which can affect the depress urization rate and the fuel composition.

In the atmospheric generator, the fuel flow rate will be set by the nitrogen/hydrogen mix purge flow rate, which is controlled accurately by orifices in the gas supply line. Also, fuel bypass of the cell stack is not likely to occur at one atmosphere, so that all fuel flow into the stack is assumed to reach the cells without bypassing. In the pressurized design, the fuel flow rate will depend on the exhaust flow rate, the total mass of gas in the test vessel (a function of the temperature gradients inside the test vessel), and the purge flow rates. The fuel purge gas flow rate may be small compared to the fuel flow from depressurization. The exhaust flow may be controlled by a fixed flow resistance (such as, a valve) in the exhaust line. The flow will vary as the system depressurizes, from higher flow at the beginning of the depressurization to lower flow at the end of the depressurization. Furthermore, the hydrogen and carbon monoxide content of the fuel will decline as the fuel is used. The net result is that the fuel consumption at the cells could be significantly higher or lower than the predicted value, depending on how these various factors deviate from the calculated values, making the expected for flow rate and cell voltage difficult to estimate.

As can be seen, a pressurized SOFC generator poses a substantially greater number of difficulties and imponderables during shutdown, to the extent that it is a completely different generator than an atmospheric generator. What is now needed is an advanced energy dissipater design for the new SOFC generators which will operate in a pressurized environment and which can meet changing voltage situations.

The present invention has been developed in view of the foregoing and to address other deficiencies of the prior art.

SUMMARY OF THE INVENTION

It is a main object of this invention to provide an improved fuel dissipater that will be effective when used in a pressurized SOFC generator and which can meet changing voltage situations. These and other objects are accomplished by providing a fuel cell generator characterized by and comprising: solid oxide electrolyte fuel cell stacks acting on pressurized hydrogen and carbon monoxide-containing fuel and pressurized oxygen-containing oxidant to provide electrical energy, in which the stacks have positive and negative terminals; a stack energy dissipater which operates on amplitude proportioning of a resistive load, comprising an electrical resistance load, said load comprising an array of at least two cooled, electrically connected resistors controlled by a voltage-sensitive multi-settable point relay, where individual switching contactors allowing for variable resistance loads are disposed between the array and a circuit breaker; where the circuit breaker is in electrical contact with the positive terminal and each of the resistors in the array is in contact with the negative terminal, so that the energy dissipater can draw current, in order to consume hydrogen and carbon monoxide-containing fuel stored within the generator during a transient operation. When a wide range of current is desired, at least three resistors arranged in parallel/series combination is highly preferred. The use of at least three resistors provides the most flexible system. A very useful array contains from three to about seven resistors and FIG. 3 illustrates use of four resistors (resistance elements). The current is dissipated as heat, and the problems associated with the oxidation of hydrogen-rich fuel in the combustion zone of the fuel cell generator are reduced or eliminated.

The invention also includes a method of dissipating energy during shutdown of a fuel cell generator characterized by and comprising: converting pressurized hydrogen and carbon monoxide-containing fuel and pressurized oxygen-containing oxidant to electrical energy in a fuel cell generator; shutting down the fuel cell generator; and drawing current from the fuel cell generator after the generator shuts down thereby to consume at least a portion of the hydrogen and carbon monoxide-containing fuel remaining in the generator and to convert the fuel to oxidized products, thereby to substantially prevent overheating of the generator, wherein the fuel cell generator contains solid oxide electrolyte fuel cell stacks having positive and negative terminals, where a stack energy dissipater which operates on amplitude proportioning of a resistance load is effective to draw current from the fuel cell generator after shutdown by means of an array of at least two electrical resistors providing a load which is electrically connected to the negative terminal at two or more locations, where the electrical resistors are also electrically connected through individual switching contactors and an associated voltage sensitive multi-settable point relay to a circuit breaker, which circuit breaker is electrically connected to the positive terminal at two or more locations, and where the fuel and the oxidant are pressurized to over 151.6 kPa. The term "kPa" here means k pascals absolute pressure. In all instances, the term "amplitude proportioning of a resistance load" means that the resistance of the load is changed by switching resistors into and out of the circuit, in response to changing fuel cell stack voltage, requiring use of at least 2 resistors. However, as mentioned previously, use of at least 3 resistors provides the most flexible system when a wide range of current is desired.

Thus, this invention requires a network of resistors which maybe switched into and out of the circuit to maintain the stack voltage between minimum and maximum limits, where resistors are individually switched at different voltage levels. The switching of resistors into and out of the circuit in response to changing voltage constitutes control of the stack voltage and current by amplitude modulation of the resistance. After the fuel is oxidized, the energy dissipater is passively and automatically disconnected. The term "pressurized", as used herein, means operating at a pressure over 1.5 atmospheres (151.6 kPa or 22 psi).

Operation of the "stack energy dissipater" or SED is especially important when depressurizing pressurized hybrid for cell/micro-turbine generator systems. In pressurized systems the quantity of fuel which must be consumed is much greater than in unpressurized systems, and the release rate (and, therefore, the current required to dissipate the fuel) can be much higher. In order to reduce the pressure in the generator, the mass of gas must be reduced by flowing out through the cell stack exhaust. Typically the depressurization rate is very high at the beginning of a shutdown transient and becomes less as the pressure becomes lower. Thus, the flow rate of the fuel vented from the stack is much higher at the beginning of a depressurization transient than it is at the end. It is necessary to draw high current to dissipate the high fuel flow rate early in the depressurization, but this same high current may damage the cell stack later in the depressurization when the flow rate of fuel being vented is lower. Further, the release rate may be difficult to control, or predict, and it may strongly depend on the operating conditions of the generator immediately before depressurization. The depressurization rate may be much higher and the quantity of fuel to be dissipated much larger if the transition to shutdown occurs when the generator is colder, such as during heatup and loading, than if the transition occurs during steady state operation. The fuel composition (and therefore the heating value) will be different if transition to shutdown occurs while the generator is being loaded, than it would be if the transition was from steady state operation. Similarly, the depressurization rate may be much higher if the air flow into the generator is lower, such as during an emergency shutdown situation where the air supply may be bottled air at a rounded flow rate, as opposed to a normal shutdown where the air supply is the gas turbine compressor and the air flow rate is high. The same "stack energy dissipater" or SED may be required to handle all of these various conditions without damaging the cells, and so it is essential for pressurized systems to operate the stack energy dissipator on amplitude proportioning of a resistance load.

BRIEF DESCRIPTION OF THE DRAWINGS

The invention is further illustrated by the following non-limiting drawings, in which.

DESCRIPTION OF THE PREFERRED EMBODIMENT

Figure 1:
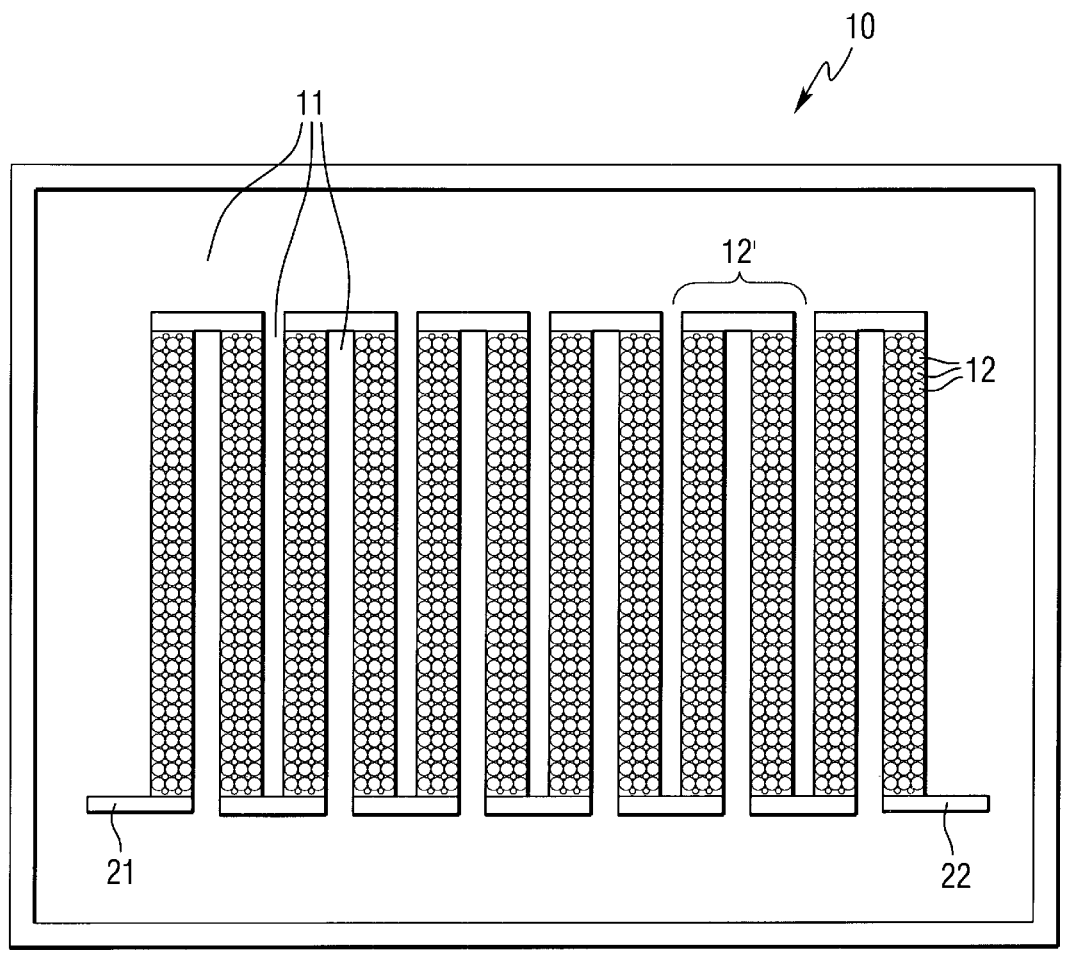
FIG. 1 is a schematic plan view of a SOFC generator stack showing the arrangement of multiple tubular fuel cells within the generator.

FIG. 1 is a schematic top view of a conventional SOFC generator stack 10 showing the arrangement of multiple tubular solid oxide fuel cells (SOFCs) 12 into a plurality of fuel cell bundle rows 12' within the generator. Positive and negative electrical connection buses 21 and 22 are shown electrically connected to the bundle rows 12', which provide electrical energy. Insulation 11, usually in the form of low-density porous alumina insulation boards, surrounds the SOFCs 12.

Figure 2:
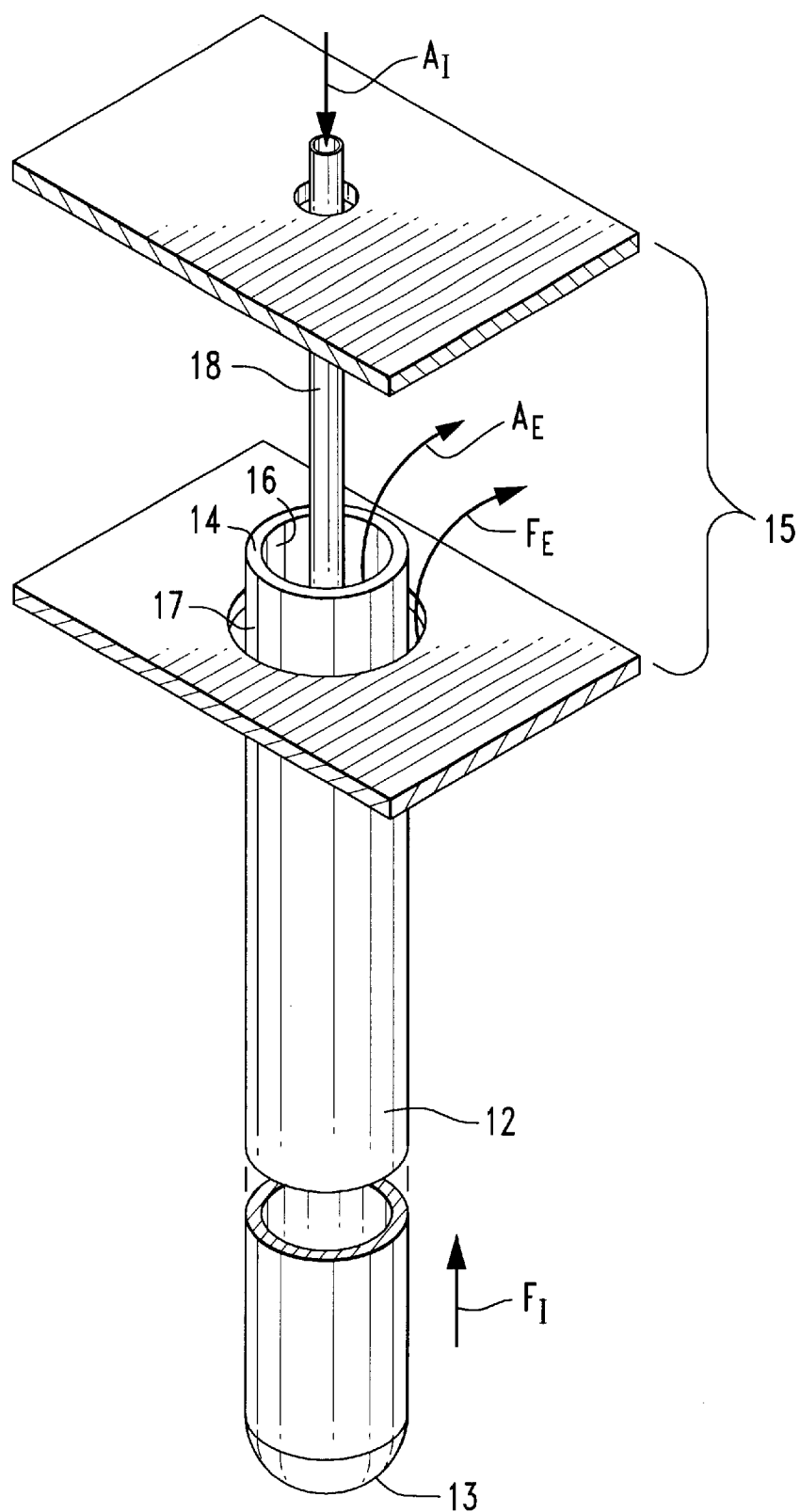
FIG. 2 is a perspective view of an individual tubular fuel cell having an open top end which extends into the combustion zone of a fuel cell generator.

FIG. 2 is a perspective view of an individual tubular fuel cell 12 having a bottom end 13 and a top end 14 which extends into a combustion zone 15 of the fuel cell generator. The inner layer of the fuel cell 12 comprises a porous air electrode 16, while the outer layer of the fuel cell comprises a porous fuel electrode 17. During normal operation of the fuel cell, oxygen-containing oxidant gas, such as air, $A_I$ is introduced into the fuel cell 12 by a tube 18. After the air or other oxygen-containing gas is injected by the tube 18 into the fuel cell 12, it is exhausted $A_E$ through the open upper end 14 of the fuel cell. During electrical power generation operations, the air exiting the fuel cell 12 has a reduced oxygen content due to its consumption within the cell. Hydrogen-containing fuel $F_I$, typically in the form of reformed natural gas or the like, flows along the exterior of the fuel cell 12 in contact with the porous fuel electrode 17. During electrical power generation operations, most of the hydrogen in the fuel is consumed in a known manner to produce electrical energy. In the pressurized SOFC generator of this invention, $A_I$ and $F_I$ will be introduced at a pressure greater than 1.5 atmospheres (151.6 kPa) and up to about 10 atmospheres (1013 kPa).

During shutdown of the generator, the hydrogen and carbon monoxide fuel is no longer consumed and the fuel $F_E$ passing into the combustion zone 15 is rich in hydrogen and carbon monoxide. At the same time, the oxygen-containing gas AE injected into the fuel cell 12 is no longer depleted, and oxygen-rich gas exhausts through the open end 14 of the fuel cell into the combustion zone 15. Thus, during a generator shutdown, the introduction of additional hydrogen, carbon monoxide and oxygen into the combustion zone 15 causes more combustion and higher temperatures within the combustion zone. In this invention, the chemical energy of the hydrogen and carbon monoxide containing fuel remaining within the fuel cell stacks and porous insulation surrounding the stacks is converted to electrical energy and dissipated as heat in the array of resistors outside the generator, instead of by burning with oxidant in the generator.

Figure 3:
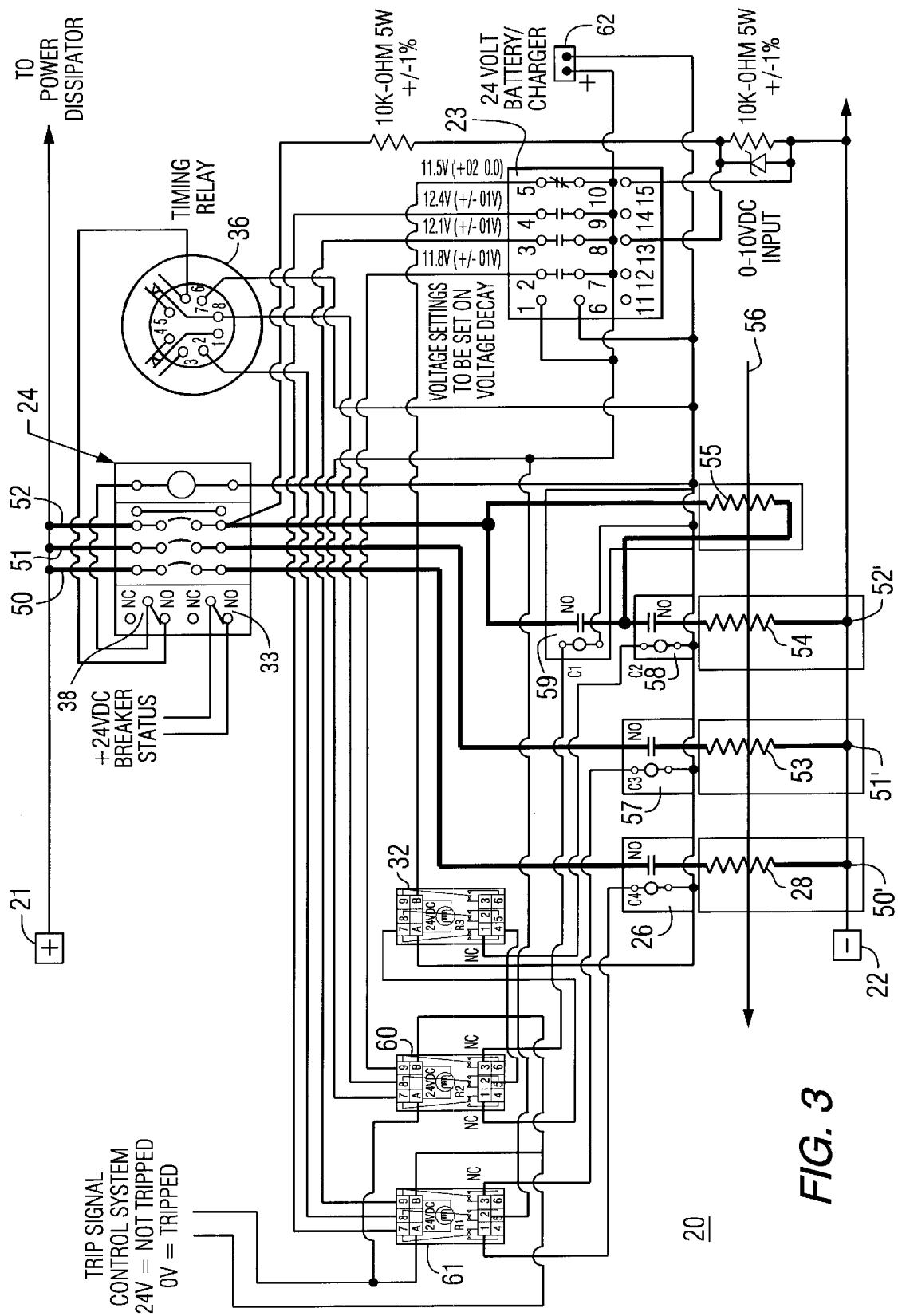
FIG. 3 is a schematic diagram of a fuel cell generator energy dissipater in accordance with one embodiment of the present invention.
Figure 4:
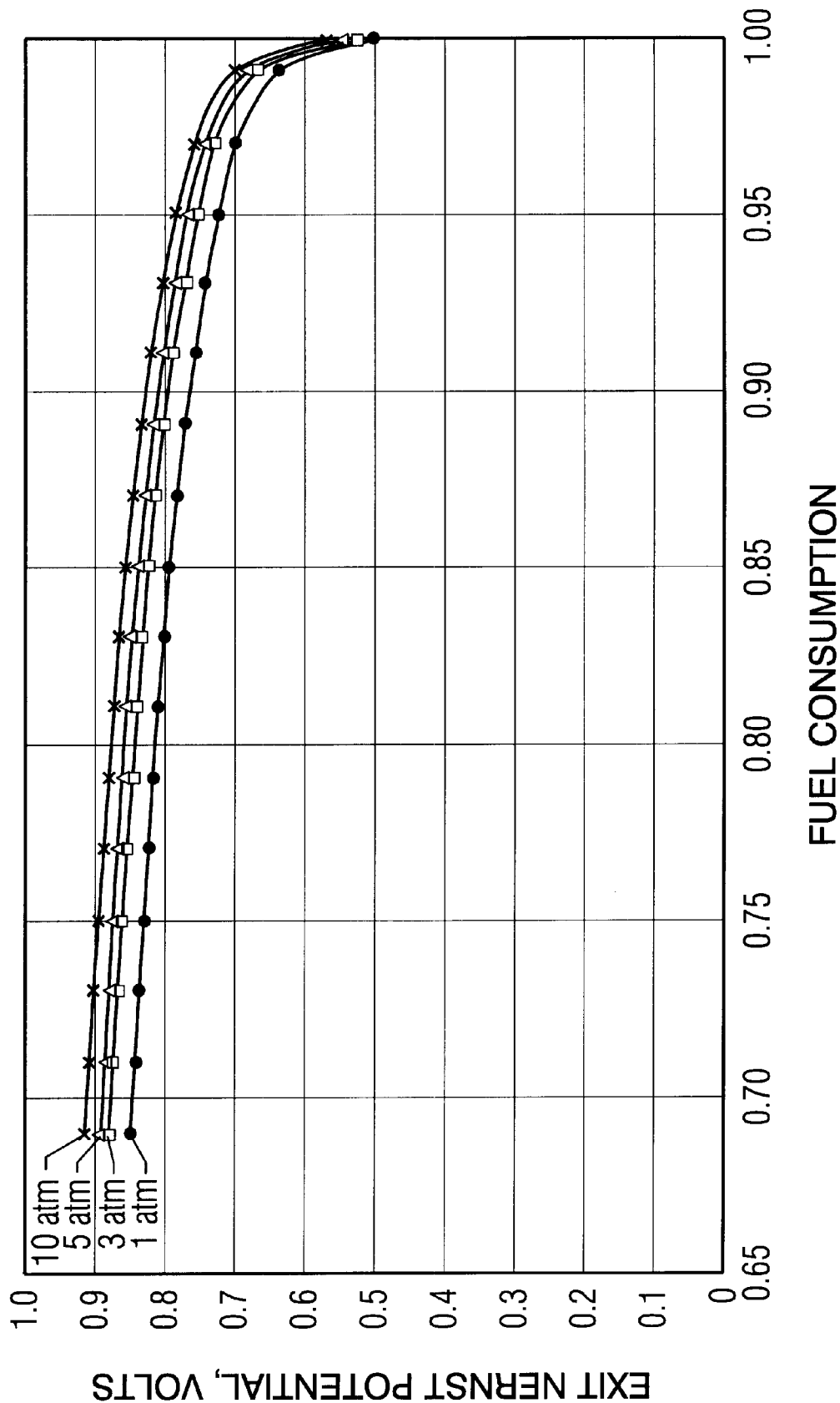
FIG. 4 shows the expected Nernst potential for different fuel consumption at expected shutdown conditions.

In accordance with the present invention, increased temperatures in the combustion zone 15 are reduced or eliminated by drawing current from the fuel cell 12 during shutdown of the generator. As used herein, the term "shutdown" means the opening of the electrical load circuit consisting of the SOFC dc output and any electrical loading device such as a DC/AC inverter system. The energy dissipater of the present invention includes at least two air-cooled electrical resistors, which dissipate electrical energy from the fuel cells in the form of heat. The electrical resistors may be of any suitable size and resistance. For example, four electrical resistance heaters of around 9 ohms resistance each encased in a stainless steel bar weighing approximately 600 pounds will suffice for a 300 kW pressurized SOFC stack design. These parameters may be altered, depending on the particular stack design with which this device will be employed. Preferably at least one resistor (55) may be switched by relays to be in series with the other resistors, as shown in FIG. 3. Thus, if there are three resistors, two would preferably be as parallel and a third resistor can be switched into that circuit in series allowing greater variation of resistance used.

During normal operation of the pressurized fuel cell generator, the operating temperature in the combustion zone is usually from about 850° C. to about 1000° C. However, during shutdown without fuel dissipation, the temperature in the combustion zone may increase by 250° C. or more by burning the fuel. In accordance with the present invention, the buildup of heat in the combustion zone upon shutdown of the generator is substantially prevented. If the same amount of heat energy is distributed uniformly over the total mass of the cell stack by electrochemical utilization of the fuel, the resulting temperature increase would be about 9° C. Since the cells are 50% efficient, half the energy will be dissipated in the resistors of the system energy dissipater and half will heat the cells so that the resulting stack rise will be about 4° C. Thus, the temperature in the combustion zone does not increase by more than about 4° C. after the pressurized generator shuts down.

FIG. 3 is a schematic diagram of a fuel cell generator stack energy dissipater (SED) 20 in accordance with an embodiment of the present invention. Relay contacts are shown with the relay coils de-energized. The energy dissipater 20 is connected across electrical conductors connected to the main positive and negative terminals 21 and 22 of the fuel cell generator. The major components of the energy dissipater include a voltage sensitive, multi-settable point sensor relay 23 that takes its power from the power bus being sensed, or from an external source; resistors, or resistance elements, which must be at least two, preferably at least three, and can be, as shown in this embodiment four elements, 28, 53, 54, and 55, to serve as an electrical load on the cell stack; relays 32, 36, 60, and 61 and contractors 26, 57, 58, and 59 to switch the load into and out of the circuit; and a shunt trip circuit breaker 24, having at least two major connections to the positive terminal 21 (to electrical conductors connected to the terminal). The connections are shown as 50, 51 and 52 in FIG. 3. The circuit breaker 24 is effective to disconnect the at least two preferably three resisting elements (load) from the power bus 21 and 22 when a specified appropriate minimum low voltage level is detected. Four separate resisting elements 28, 53, 54 and 55, preferably in parallel and series combination as shown, are shown in FIG. 3, all being cooled by an air or water stream 56 passing, for example, through a conduit. Natural convection or radiation cooling could or the resistors could also be used, or the resistors could be sealed and placed in a water-cooled environment, or the resistors could heat a metal mass. The resisting elements (or resistors) have at least two major connections to the negative terminal 22 (to electrical conductors connected to the terminal). The connections are shown as 50', 51' and 52' in FIG. 3. Contactors 26, 57, 58 and 59, each associated with a resisting element, close the dissipater circuit when coils C1 through C4 are energized. Two three-pole relays 60 and 61 are used to enable and disable the SED remotely. Relay 32 is used to disable the SED when the minimum allowable stack voltage is sensed.

Referring again to FIG. 3, the load, which can range from two to about seven resistors, in this embodiment, as shown, consists of four separate air cooled resistors 28, 53, 54 and 55, as described previously (and not necessarily equal resistors), connected in a series/parallel configuration. Commercial immersion heaters of the appropriate rating or radiant heaters could also be used, as required by the application. Each resistor is connected in series with a contactor (one of 26, 57, 58 and 59) and with the four pole shunt trip breaker 24. The contactors 26, 57, 58 and 59 switch the resistors in and out of the load circuit. They are actuated by coils C4, C3, C2 and C1. Three of the four contactor coils C1, C3, and C4 are energized or de-energized by a quad setpoint voltage sensor module 23. The fourth contactor C2 is energized immediately upon initiation of the trip signal. After timer relay 36 closes, C2 remains connected across the generator terminals until the SED is disengaged by opening the shunt trip breaker 24. Relays 60 and 61 situated between the quad setpoint relay 23 and coils C1 through C4 are used to activate or deactivate the circuits to the coils C1 through C4. During normal operation of the SOFC generator, relays 60 and 61 are energized by a voltage signal from the SOFC control system. This opens the contacts in 60 and 61, deactivating the SED by de-energizing the coils C1 through C4 and their associated contactors 25, 57, 58 and 59. When the SED is needed, the SOFC control system removes the energizing voltage from relays 60 and 61, closing the contacts in relays 60 and 61 and completing the circuit between 23 and coils C1 through C4.

Relay 32 is part of the disconnect circuit. Its coil is energized by the fourth contact of the quad setpoint relay 23. When the stack voltage drops to the minimum permissible voltage, contact 5-10 of 23 opens, de-energizing 32 and causing contact 7-1 of 32 to change state to 7-4. This de-energizes C2, opening contactor 58 and disconnecting resistors 54 and 55. At the same time, the change of state of relay 32 from 7-1 to 7-4 completes a circuit which activates the trip coil of shunt trip breaker 24. A set of auxiliary contacts 38 remove any sustained voltage from being impressed across the low energy shunt trip coil in breaker 24. The auxiliary contact 38 open when the shunt trip coil trips the circuit breaker 24 open. This ends the sequence. Before restart, the circuit breaker 24 must be manually reset. A circuit breaker status indicator 33 may optionally be used to indicate whether the circuit breaker 24 is tripped.

A timing relay 36 is provided between relay 32 and shunt trip breaker 24 to prevent premature disconnection should the stack voltage drop momentarily below the minimum voltage when the SED is first engaged. When the SED is first engaged, the contacts within the timer will be open, blocking the shunt trip signal to circuit breaker 24. After a predetermined time, the timer will change state, closing the contacts and enabling activation of the shunt trip circuit in 24. In the interim, the quad setpoint relay 23, by energizing and de-energizing relay 32, can connect and disconnect series resistors 54 and 55 permitting the SED to unload (open circuit) the generator on low voltage and reload the generator if the voltage recovers. If the voltage increases to higher levels, the other relays and resistors will respond to control the voltage accordingly.

The quad setpoint module senses four separate, programmable voltage setpoints, each associated with one of four contacts 2-7, 3-8, 4-9, and 5-10 in the module 23. The contacts in the module 23 change state (de-energize) when the voltage drops below their respective setpoints. Should the voltage rise above the setpoint, the contacts change state (energize) and close again. The device permits individual switchung of the contactors 26, 57, 58 and 59, and places the corresponding resistors across the cell terminals. The net result is that when the voltage rises, more of the parallel resistor legs are switched in, and current flow increases. When the voltage drops, one or more of the resistors 28, 53, 54 and 55, which may have different resistance values, is switched out, causing current flow and fuel consumption to decrease. If the reduced fuel consumption results in reestablishing the stack voltage, one or more of the resistors may be switched back into the circuit. The objective is to maintain the stack voltage between predetermined levels until the residual fuel is spent and the generator can no longer support the terminal voltage. At the predetermined low voltage level, the dissipater will permanently open the circuit to prevent the cells from operating at the nickel oxidation potential. Final lockout of the dissipater is accomplished through the lowest module setpoint contact 5-10, where the closure of the low voltage channel results in the permanent trip of the shunt trip breaker 24. A manual reset of the shunt trip/breaker 24 is required to rearm the dissipater.

In a quad setpoint system, the setpoint module controls three resistor legs and one shunt trip breaker. Any number of resistor kegs is possible, depending on the needs of the application. In the example of FIG. 3, the relays can vary the load to effect any of four configurations in response to the stack voltage: three parallel resistors (stack voltage >12.4V, contacts 2-7, 3-8, and 4-9 closed in 23, contact 5-10 open), two parallel resistors (12.1V<stack voltage<12.4V, contacts 4-9 and 5-10 open, all other contacts closed in 23), one resistor (11.8V<stack voltage<12.1V, contact 3-8 closed, all other contacts open in 23), and in two series resistors (1.5V<stack voltage<11.8V, all contacts open in 23). Resistor 55 is the series resistor, which is always wired in series with contactor 58 and resistor 54. For the parallel resistance combinations resistor 55 is shorted by closing contact 59, effectively removing resistor 55 from the load.

Note that contact 5-10 of 23 is a fail closed contact ad opens when energized. Closing this contact energizes the shunt trip circuit breaker, which opens the circuit between the SED and the generator terminals, thus disconnecting the SED. The shunt trip breaker must be reset manually to rearm the SED.

Note also that the voltages given in the embodiment of FIG. 3 are appropriate for a small generator stack of 48 cells. For larger stacks, the voltage setpoints for each contact will be higher and the voltage divider resistances (10K-ohms in FIG. 3) required to scale the stack voltage to the 0–10V input range of the multi-setpoint module will be different.

Because of the ability to adjust the resistance in response to change in the stack voltage (either up or down), this system has advantages when the flow conditions are not well known, or when flow oscillations or fuel composition changes might occur. If the system is engaged and the fuel flow rate is lower than expected, or if the H2+CO composition is not as high as expected, the module will adjust the total load to compensate. Conversely, there is much greater design latitude to compensate for uncertainties in the fuel flow analyses. By selecting a total resistance that provides for higher than expected currents, the dissipater can be configured to allow for higher than expected fuel flow. This allows for the fluid system design to be less complex, since flow conditions do not need to be as precisely known to protect the cells. In the design of this invention, as shown in FIG. 3, the quad setpoint sensing module combines the functions if several devices to achieve the desired results: stack voltage sensing, voltage setpoint adjustment, and relay contacts to actuate the cells of the switching contactors. These functions could reside in separate devices, if desired. Also shown is a separate battery power supply 62 to provide power to the setpoint module in the event of a primary power supply failure. As an alternative, the module could be powered by an uninterruptable power supply (UPS) if the generator control system is so equipped. Also shown is a 24VDC control system to enable the SED through relays 60 and 61. The control system could be configured using alternate standard voltage services (for example, 120 VAC), instead of 24 VDC.

The multi-setpoint stack energy dissipator of this invention allows the current to the reduced in response to the changing fuel flow rate (or fuel composition), without going to zero. A single resistor system would either not dissipate enough fuel at the start of the transient (resulting in high combustion zone temperatures), or would draw too much current later in the transient (resulting in damage to the cells from high fuel utilization). By varying the size of the load resistance over a very wide range of high current, the multi-setpoint dissipater keeps the cell stack combustion zone temperature within reasonable limits, but does not endanger the cells due to high fuel utilization (total depletion of the available fuel).

While specific embodiments of the invention have been described in detail, it will be appreciated by those skilled in the art that various modifications and alternatives could be developed in light of the overall teaching of the disclosure. Accordingly, the particular arrangements disclosed are meant to be illustrative only and not limiting as to the scope of the invention, which is to be given the full breadth of the claims appended and any and all equivalents thereof.

What is claimed is:

1. A fuel cell generator comprising:
solid oxide electrolyte fuel cell stacks acting on pressurized hydrogen and carbon monoxide-containing fuel and pressurized oxygen-containing oxidant to provide electrical energy, in which the stacks have positive and negative terminals;
a stack energy dissipater which operates on amplitude proportioning of a resistance load, comprising an electrical resistance load, said electrical resistance load comprising an array of at least two cooled, electrically connected resistors controlled by a voltage-sensitive multi-settable point relay, where individual switching contactors allowing for variable resistance loads are disposed between the array and a circuit breaker; and
where the circuit breaker is in electrical contact with the positive terminal and each of the resistors in the array is in electrical contact with the negative terminal, so that the energy dissipater can draw current, in order to consume hydrogen and carbon monoxide-containing fuel stored within the generator during a shutdown.

2. The fuel cell generator of claim 1, wherein the fuel cell stacks comprise a plurality of tubular solid oxide fuel cells having an inner air electrode in contact with the oxygen-containing gas, an outer fuel electrode in contact with the hydrogen-containing fuel, and an open end extending into a combustion zone in flow communication with the oxygen-containing gas and the hydrogen containing fuel.

3. The fuel cell generator of claim 1,
wherein the generator comprises a combustion zone in flow communication with the hydrogen and carbon monoxide-containing fuel and the oxygen-containing gas, and the energy dissipater substantially prevents a buildup of heat in the combustion zone after the generator shuts down.

4. The fuel cell generator of claim 3, wherein an operating temperature in the combustion zone is from about 850° C. to about 1,000° C., and the temperature in the combustion zone does not increase by more than about 30° C. after the generator shuts down.

5. The fuel cell generator of claim 1,
wherein the chemical energy of the hydrogen and carbon monoxide-containing fuel remaining within the fuel cell stacks and porous insulation surrounding the stacks is converted to electrical energy and dissipated as heat in the array of resistors, instead or more multi-settable point relays.

6. The fuel cell generator of claim 1, wherein the energy dissipater also contains an enabling relay to receive a signal from a control system and shutdown circuits, disabling the switching contactors until such a signal is received.

7. The fuel cell generator of claim 1,
wherein the energy dissipater also contains a timing relay to permit time for energy dissipation, regardless of the voltage level at initiation of the dissipater.

8. The fuel cell generator of claim 1, wherein the circuit breaker is a latching trip breaker effective to disconnect the load when a specified minimum voltage is detected.

9. The fuel cell generator of claim 1, wherein the fuel and oxidant are pressurized to over 151.6 kPa.

10. The fuel cell generator of claim 1,
wherein
the fuel and oxidant are pressurized to between 151.6 kPa and 1013 kPa.

11. The fuel cell generator of claim 1, wherein the array of electrically connected resistors contains at least three resistors.

12. The fuel cell generator of claim 11,
wherein the resistors are connected in parallel, and series, where at least one resistor operates in series relationship and the individual contactors switch the resistors.

13. A method of dissipating energy during shutdown of a pressurized fuel cell generator comprising:
converting pressurized hydrogen and carbon monoxide-containing fuel and pressurized oxygen-containing oxidant to electrical energy in a fuel cell generator;
shutting down the fuel cell generator;
drawing current from the fuel cell generator after the generator shuts down utilizing a stack energy dissipater containing at least three resistors having a resistance load, thereby to consume at least a portion of the hydrogen and carbon monoxide containing fuel remaining in the generator and to convert the fuel to oxidized products thereby to substantially prevent overheating of the generator, utilizing an array of the at least three resistors to amplitude proportion a resistance load in the stack energy dissipater; and
wherein the fuel cell generator contains solid oxide electrolyte fuel cell stacks having positive and negative terminals, where the stack energy dissipater which operates on amplitude proportioning of a resistance load is effective to draw current from the fuel cell generator after shutdown by means of the array of at least three resistors controlled by a voltage-sensitive multi-settable point relay where individual switching contactors allowing for variable resistance loads are disposed between the array and a circuit breaker, and where the fuel and the oxidant are pressurized to between 151.6 kPa and 1013 kPA.

14. The method of claim 13, wherein the chemical energy of the hydrogen and carbon monoxide containing fuel remaining within the fuel cell stacks and porous insulation surrounding the stacks is converted to electrical energy and dissipated as heat in the array of resistors, instead of by burning with oxidant in the generator.

15. The method of claim 13, wherein the fuel cell stacks comprise a plurality of tubular solid oxide fuel cells having an inner air electrode in contact with the oxygen-containing gas, an outer fuel electrode in contact with the hydrogen-containing fuel, and an open end extending into a combustion zone in flow communication with the oxygen-containing gas and the hydrogen containing fuel.

16. The method of claim 13, wherein the resistors are connected in parallel and series, where at least one resistor operates in series relationship.

* * * * *